(12) United States Patent
Kuper

(10) Patent No.: US 6,357,039 B1
(45) Date of Patent: *Mar. 12, 2002

(54) AUTOMATIC CODE GENERATION

(75) Inventor: Ron I. Kuper, Arlington, MA (US)

(73) Assignee: Twelve Tone Systems, Inc, Boston, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/034,116

(22) Filed: Mar. 3, 1998

(51) Int. Cl.[7] ................................................. G06F 9/45
(52) U.S. Cl. ............................................. 717/5; 717/2
(58) Field of Search ........................... 395/705, 702; 379/34; 348/565, 275; 345/348, 339; 84/603, 622, 601, 600, 1.01; 717/5, 2

(56) References Cited

U.S. PATENT DOCUMENTS

| | | | | |
|---|---|---|---|---|
| 4,177,706 A | * | 12/1979 | Greenberger ................. | 84/625 |
| 4,901,221 A | * | 2/1990 | Kodoski et al. ............. | 345/771 |
| 5,113,259 A | * | 5/1992 | Romesburg et al. ........ | 348/565 |
| 5,475,851 A | * | 12/1995 | Kodoski et al. ............. | 345/763 |
| 5,485,615 A | * | 1/1996 | Wennmyr ....................... | 717/2 |
| 5,511,198 A | * | 4/1996 | Hotta ............................. | 717/9 |
| 5,528,296 A | * | 6/1996 | Gove et al. ................... | 348/275 |
| 5,596,159 A | * | 1/1997 | O'Connell ..................... | 84/622 |
| 5,714,703 A | * | 2/1998 | Wachi et al. .................. | 84/603 |
| 5,808,221 A | * | 9/1998 | Ashour et al. ................ | 84/603 |
| 5,886,274 A | * | 3/1999 | Jungleib ........................ | 84/601 |
| 5,892,812 A | * | 4/1999 | Pester, III ................. | 379/32.02 |
| 6,018,118 A | * | 1/2000 | Smith et al. ................... | 84/600 |

OTHER PUBLICATIONS

"Code Generation & Prototyping," http://www.mathworks.com/dsp/codegen1.shtml, Dec. 30, 1997, 2 pgs.

The Math Works, Inc. "Do you want to accelerate your DSP design cycle? Start with your free Technical Kit," 8/97, 3 pgs.

The Math Works, Inc. "Matlab enables you to move effortlessly between concept and code, data and design," 5/97, 8 pgs.

"Symbolic Sound Corporation" and "Kyma," http://www.symbolicsound.com/, Jan. 9, 1998, 10 pgs.

"! Audio Architect," http://www.audioarchitect.com/, Jan. 8, 1998. 13 pgs.

"Computer Music Journal," Fall 1997 (V 21, # 3), 3 pgs. — p. 119 and two pgs. of contents.

"Duy," http://www.duy.es/duy/, Jan. 9, 1998, 8 pp.

"Native Instruments" and "Generator," http://www.native-instruments.de/english/, Jan. 9, 1998, 12 pgs.

* cited by examiner

*Primary Examiner*—Tuan Q. Dam
*Assistant Examiner*—Hoang-Vu Antony Nguyen-Ba
(74) *Attorney, Agent, or Firm*—Testa, Hurwitz & Thibeault, LLP

(57) ABSTRACT

A system for automatically generating native processor code includes a graphical designer and a compiler. The graphical designer allows a user to construct graphically a signal processing system, and the compiler receives the graphically constructed signal processing system and generates native processor code representative of the system. Also, a system for modifying input signals includes a graphical designer, a compiler, and an execution unit for receiving at least a portion of the generated code and input signals and for executing the machine code to produce as an output a version of the input signal that is modified according to the code that is representative of the graphically constructed signal processing system. Further, a system for use with a main application includes a loader for receiving machine code representative of a signal processing system, an execution unit for receiving at least a portion of the machine code from the loader and input signals and for executing the machine code to produce as an output a version of the input signals that is modified according to the signal processing system, and an interface module for receiving the output from the execution unit and for interfacing with the main application to provide the output to the main application.

36 Claims, 12 Drawing Sheets

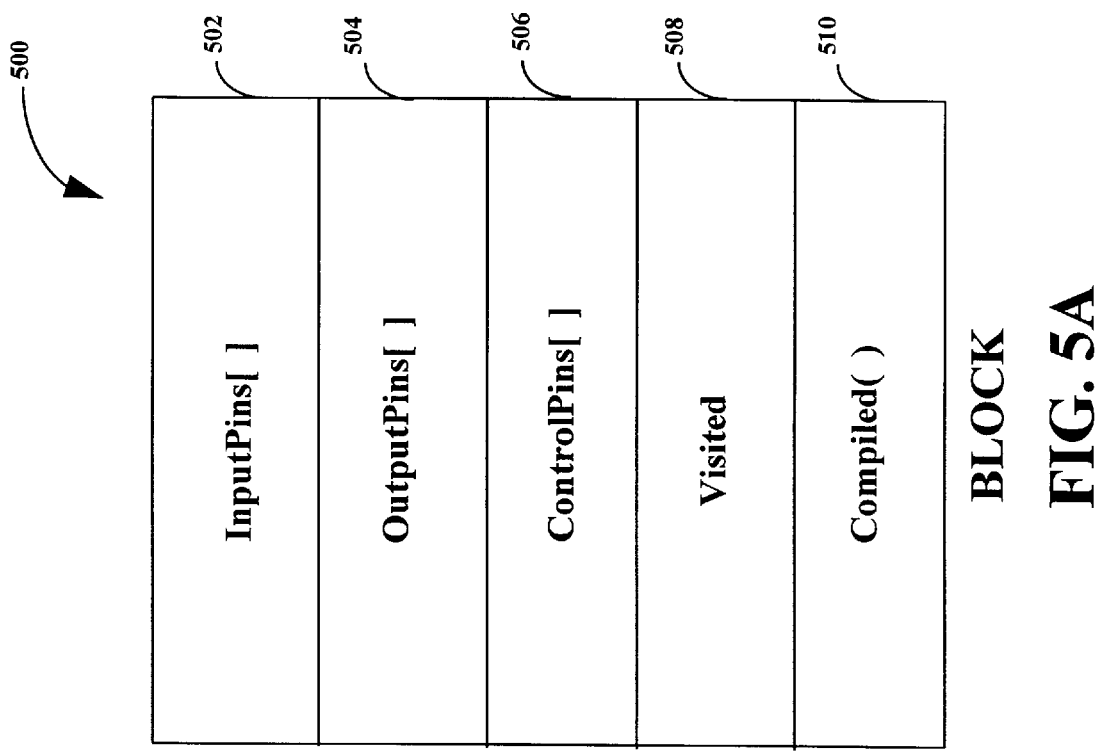

AUTOMATIC CODE GENERATION

TECHNICAL FIELD

This invention relates to signal processing systems and, more particularly, to generating native processor code for processing signals using a graphical signal processing design system.

BACKGROUND INFORMATION

Signal processing is important in music and video creation, modification, and storage. In many applications a signal is modified, for example, to reduce or emphasize some aspect of a signal, or to extract some portion or characteristic of the signal. For example, an audio or video developer can generate new signals or modify stored or live signals. A sound developer may create a series of filters to achieve a particular sound effect. A musician can create a new instrument, or modify the sound of an already existing instrument to sound like a new instrument. A video developer can implement a particular type of fade, or a interesting special effect using a signal processing system.

With the use of digital computers, it became possible to simulate signal processing systems on computers. As computer performance improved, it became possible to implement signal processing algorithms on a computer in real time. It is now possible to implement a signal processing algorithm in software on a general purpose computer. This is very useful for audio or video developers who wish to create and modify signals using commonly available tools.

One approach for implementing a signal processing system on a general purpose computer is for a developer to write a computer program that implements a particular signal processing system. A program implementing the signal processing system is often developed in a programming language like Basic, Pascal, or C. This is beyond the capacity of many users, and can be difficult to modify and change.

Another approach is to implement a signal processing system on a high performance computer that is attached to the general purpose computer. This approach is expensive because it requires additional hardware normally not found in a general purpose computer. Also, it is often not possible to easily incorporate systems designed with this approach into music and video development applications.

SUMMARY OF THE INVENTION

The present invention provides a software application that allows a user to easily generate a signal processing system. The user designs the system graphically and then the graph is compiled into native processor code. Because it is implemented in native processor code, the signal processing system can be run on a computer with minimal resources. The signal processing system implemented in native processor code can also be incorporated into other computer applications, so that the developed signal processing system is portable and useful.

In general, in one aspect, the invention features a system for automatically generating native processor code. The system includes a graphical designer for allowing a user to construct graphically a signal processing system, and it includes a compiler for receiving the graphically constructed signal processing system and for generating native processor code representative of the signal processing system.

Embodiments of this aspect of the invention include the following features. In some embodiments, the compiler includes an optimizer for generating optimized native processor code. In some embodiments, the signal processing system is an audio signal processing system. In some embodiments, the signal processing system is a video signal processing system. In some embodiments, the graphical designer allows the user to construct the signal processing system graphically by placing one or more signal processing elements between a system input and system output. In some embodiments the graphical designer allows the user to encapsulate two or more of the signal processing elements between the system input and output. In some embodiments, the signal processing elements include an arithmetic operation element and/or a delay element. Many other types of elements can also be used, as will be understood by those of ordinary skill.

In general, in another aspect, the invention features a system for modifying input signals. The system includes a graphical designer for allowing a user to construct graphically a signal processing system, a compiler, and an execution unit. The compiler receives the graphically constructed signal processing system and generates machine code representative of the system. The execution unit receives at least a portion of the machine code and input signals and executes the machine code to produce a version of the input signal that is modified according to the signal processing system.

Embodiments of this aspect of the invention include the following features. In some embodiments, the system includes a module for receiving at least a portion of the machine code and the input signals and for executing the machine code to produce the output and for providing the output to a main application. In some embodiments, the graphical designer allows the user to construct graphically the signal processing system by placing one or more signal processing elements between a system input and a system output. In some embodiments the graphical designer allows the user to encapsulate two or more of the signal processing elements into a single encapsulated signal processing element to allow the user to construct graphically a hierarchical signal processing system having one or more of the encapsulated signal processing elements between the system input and output. In some embodiments the compiler includes an optimizer for generating optimized machine code.

In general, in another aspect, the invention features a system for use with a main application. The system includes a loader for receiving machine code representative of a signal processing system. The system also includes an execution unit for receiving at least a portion of the machine code from the loader and input signals and for executing the machine code to produce as an output a version of the input signals that is modified according to the signal processing system. The system further includes an interface module for receiving the output from the execution unit and for interfacing with the main application to provide the output to the main application.

Embodiments of this aspect of the invention include the following features. In some embodiments, the main application comprises a music processing application. In some embodiments, the input signals comprise audio signals and the signal processing system comprises an audio signal processing system. In some embodiments, the input signals comprise video signals and the signal processing system comprises a video signal processing system.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 5A is a block diagram of a block object for describing the elements of a graph.

DESCRIPTION

Figure 1A:
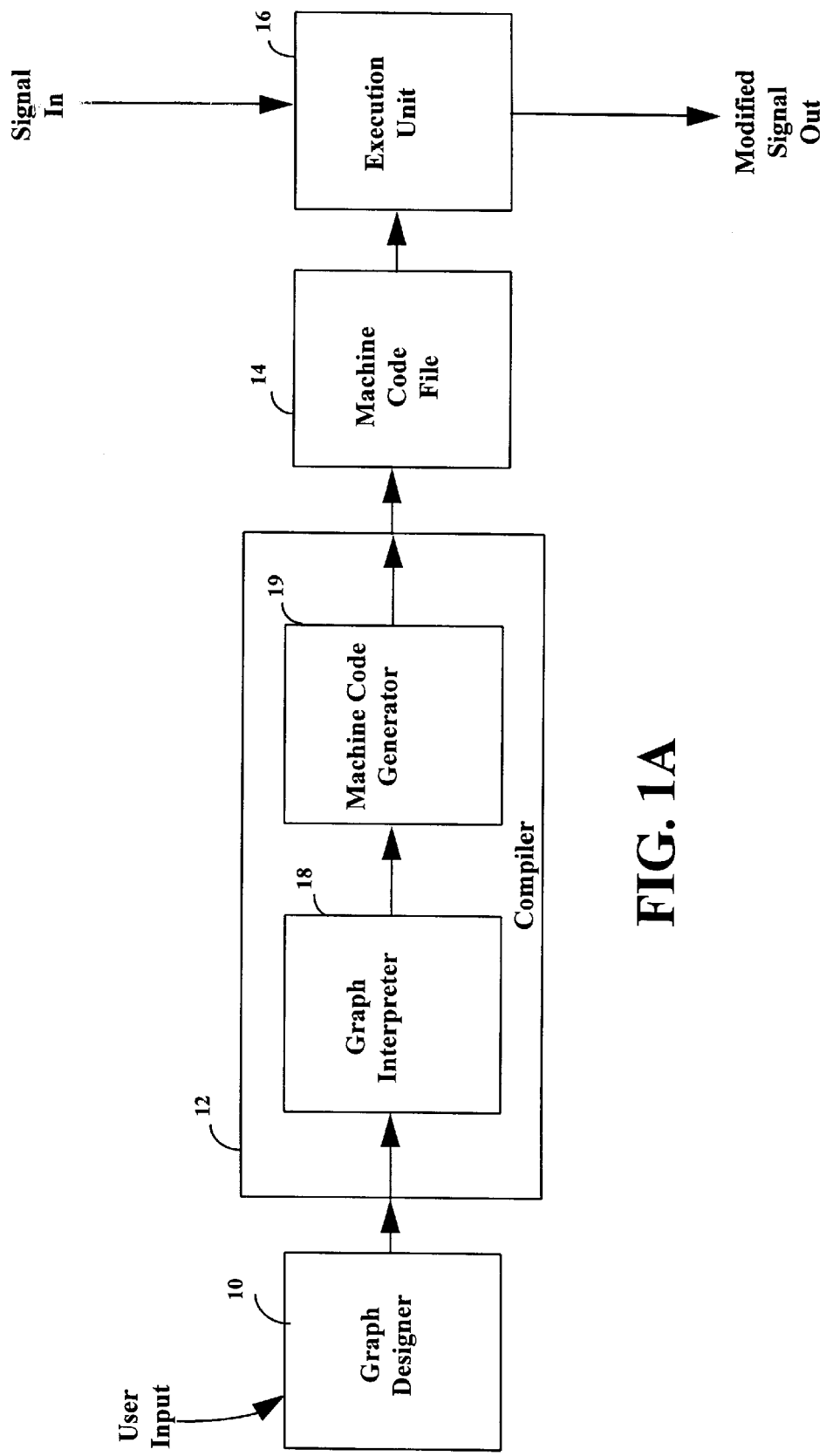
FIG. 1A is a block diagram of a system according to the present invention.

FIG. 1A provides an overview of the present invention. In the system of FIG. 1A, a graphical designer 10 is used to create a graph of an audio or video signal processing system to be implemented. Users utilize the graphical designer 10 in order to construct graphically a signal processing system. The graphical designer 10 allows the user to construct a signal processing system graphically by placing one or more signal processing elements between a system input and one or more system outputs. Each element of the graph symbolizes an element of a signal processing system. The signal processing elements can include mathematical operations such as addition, subtraction, multiplication, division, and absolute value calculations. The signal processing elements can also include such elements as a delay element, an integrator, an accumulator, a floor or ceiling element, and an interpolation from a lookup table. Signal sources can also be included as elements, for example a clock signal or tone generator, and a constant or variable source. A probe element can also be included that will display or graph values at a particular point in the graphical processing system. Other types of elements are possible and will be known to those of ordinary skill. The graphical designer 10 allows the user to encapsulate two or more of the signal processing elements into a single encapsulated signal processing element to allow the user to construct graphically a hierarchical signal processing system having one or more of the encapsulated signal processing elements between the system input and output.

A compiler 12 translates the graphically constructed signal processing system into a machine code file 14. The machine code file 14 is representation in native processor code of the graphically constructed signal processing system. The machine code file can be used as an input to an execution unit 16. The execution unit 16 takes an audio or video file or stream as an input, and uses the machine code file 14 to output modified audio or video. The machine code file 14 can also be incorporated as a plug-in into software application programs, as described hereinafter with reference to FIGS. 1B and 3.

The compiler 12 includes a graph interpreter 18 and a machine code generator 19. The graph interpreter 18 interprets the data produced by the graphical designer 10 and translates the data into pseudo-code. The machine code generator 19 translates the pseudo-code into processor-specific machine code, also called native processor code, that can implement the signal processing system graphically designed by the user with the graphical designer 10. In one embodiment, the machine code generator 19 includes an optimizer for generating optimized native processor code. Optimizers and optimization routines and techniques are well known.

Figure 1B:
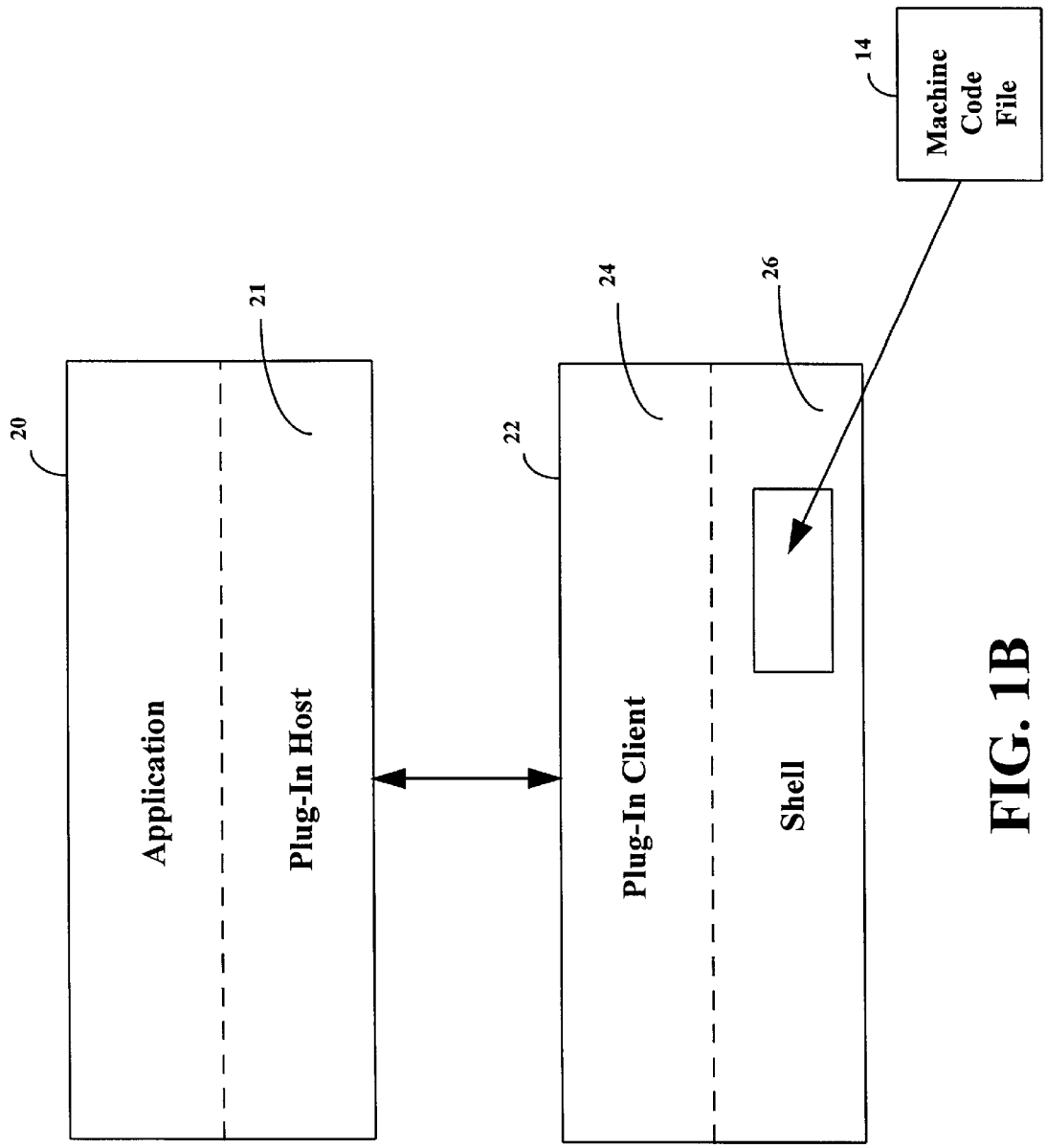
FIG. 1B is a block diagram of a plug-in according to the present invention.

FIG. 1B shows another use of machine code file 14, as part of a "plug-in" to a computer application program. A plug-in can contain code that can be executed and variables that can be manipulated from within the structure of a main program. A main application program can thereby incorporate the functionality provided by the plug-in. Examples of main applications that could usefully incorporate a signal processing system plug-in are music generation and processing applications and video generation and processing applications. The embodiment shown in FIG. 1B is a Direct X plug-in, but the same approach works with other plug-in technologies. In the block diagram of FIG. 1B, application 20 has a host component 21. The host component 21 provides an interface with a plug-in 22. The plug-in 22 has a client component 24, which interfaces with the host component 21 of the application 20. In one embodiment, the host component 21 is a Direct X Host, and the client component 24 is a Direct X Client. The plug-in 22 also contains shell or interface logic 26, and the machine code file 14. This machine code file 14 can be the same file generated in FIG. 1A or another file generated in some other fashion. The shell 26 allows the client component 24 to execute the machine code file 14. The application program 20 executes code in the host component 21, which executes the client component 24 of the plug-in, which activates the shell 26 and executes machine code file 14.

Figure 1C:
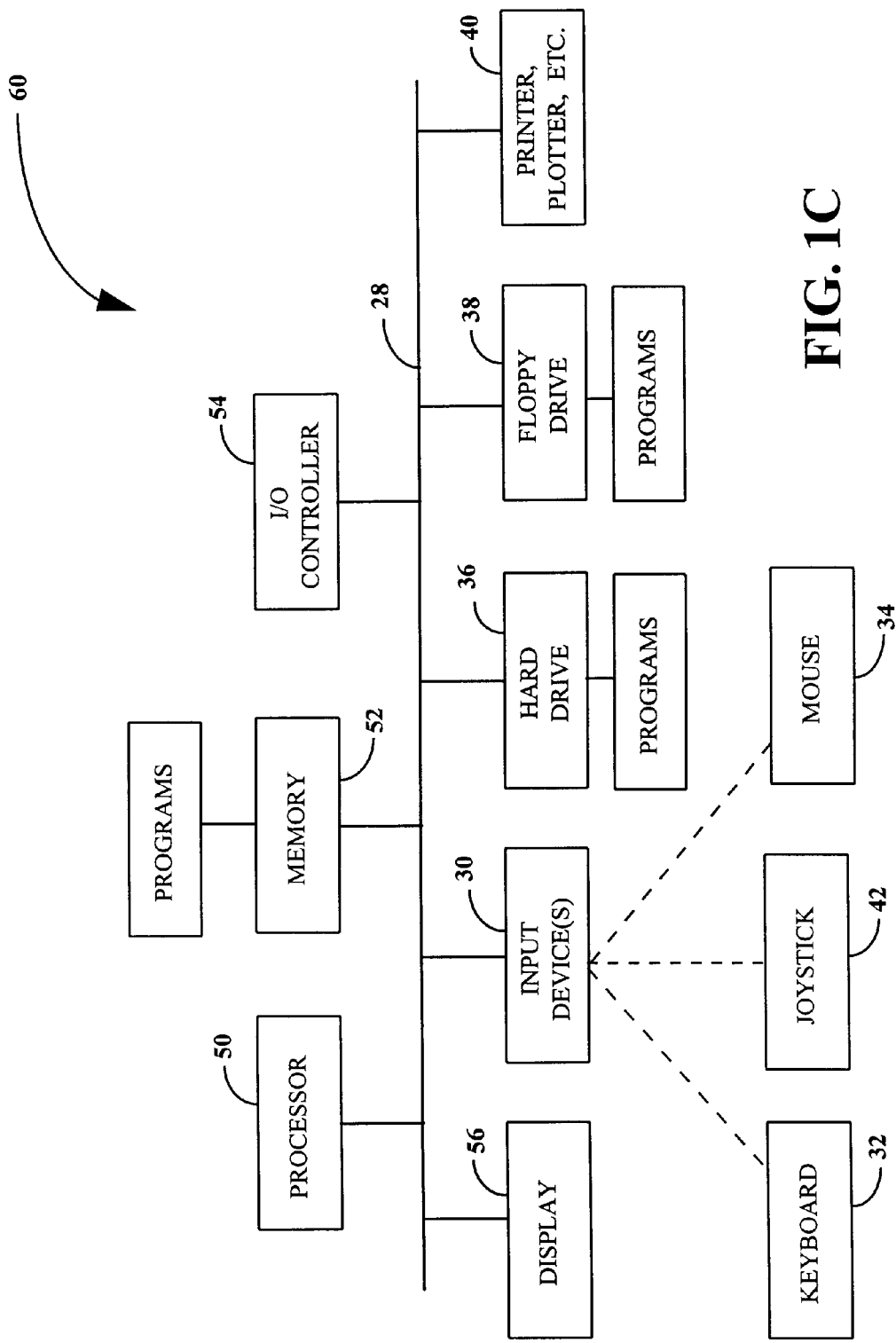
FIG. 1C is a simplified block diagram of a general purpose computer in which the present invention can be embodied.

A block diagram of a computer on which the invention can be implemented is shown in FIG. 1C. The computer can be any computer or workstation such as a PC or PC-compatible machine, an Apple Macintosh, a Sun workstation, etc. The particular type of computer or workstation is not central to the invention. In fact, the invention can be implemented in a variety of ways including an all-hardware embodiment in which dedicated electronic circuits are designed to perform all of the functionality which the programmed computer can perform. The preferred embodiment of the invention is an implementation in software for execution on a general purpose computer such as a PC running the Microsoft Windows or Microsoft Windows 95 operating system.

Referring to FIG. 1C, the computer 60 typically will include a central processor 50, a main memory unit 52 for storing programs and/or data, an input/output (I/O) controller 54, a display device 56, and a data bus 28 coupling these components to allow communication there between. The memory 52 includes random access memory (RAM) and read only memory (ROM) chips. The computer 60 typically also has one or more input devices 30 such as a keyboard 32 (e.g., an alphanumeric keyboard and/or a musical keyboard), a mouse 34, and a joystick 42. The computer 60 typically also has a hard drive 36 with hard disks therein and a floppy drive 38 for receiving floppy disks such as 3.5 inch disks. Other devices 40 also can be part of the computer 60 including output devices (e.g., printer or plotter) and/or optical disk drives for receiving and reading digital data on a CD-ROM. In the disclosed embodiment, one or more computer programs define the operational capabilities of the computer 60. These software programs can be loaded onto the hard drive 36 and/or into the memory 52 of the computer 60 via the floppy drive 38.

In one embodiment, the executable version of the programs are on the hard drive 36, and the system is caused to execute by double-clicking the appropriate icon. In general, the controlling software program(s) and all of the data utilized by the program(s) are stored on one or more of the computer's storage mediums such as the hard drive 36, CD-ROM 40, etc. In general, the programs implement the invention on the computer 60, and the programs either contain or access the data needed to implement all of the functionality of the invention on the computer 60.

Figure 2A:
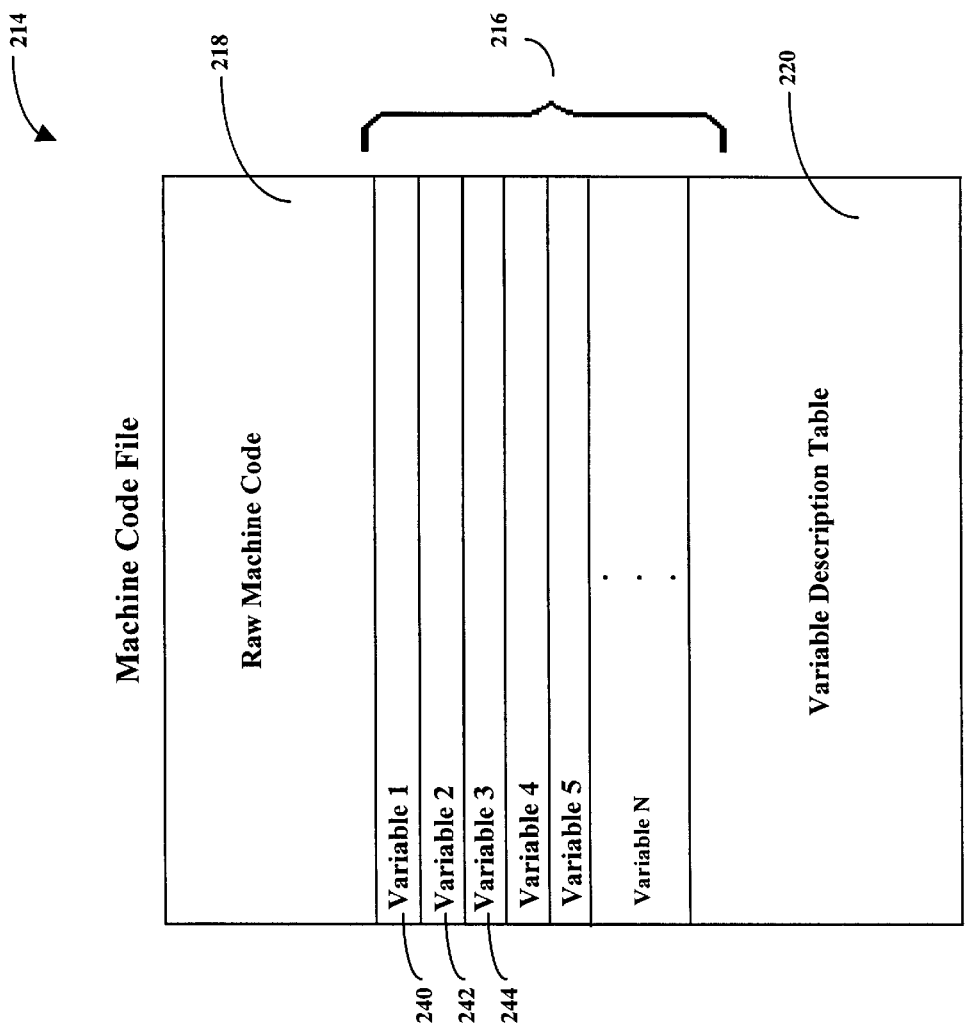
FIG. 2A is an embodiment of the machine code file shown in FIG. 1A.

Focusing back on some of the more central aspects of the invention, referring to FIG. 2, the disclosed embodiment of a machine code file 214 contains raw machine code 218, control information 216, and a variable description table 220. The raw machine code 218 is native processor instructions that are to be executed by the central processor. Because the raw machine code 218 is native processor code, it executes very quickly. The is important because it allows the signal processing to use minimal resources and operate on a relatively inexpensive machine.

The control information 216 includes a variable for each variable associated with the raw machine code 218. The control information is a data structure that contains the values of the variables used by the raw machine code 218. When the raw machine code 218 runs, the control information 216 is read into an allocated memory block, and the raw machine code 218 is provided with the location of this memory block. The raw machine code 218 uses "based addressing mode" to access individual variables.

For example, in one embodiment, a volume control multiplies an input by a constant, and produces an output. If the constant is greater than one, the magnitude of the input is amplified. If the constant is less than one, the magnitude of the input is decreased. Such a volume control would have three variables, namely SignalIn, the input, SignalOut, the output, and Volume, the constant multiplied with SignalIn to produce SignalOut. If these three variables were stored as part of control information 216, Variable 1 (240) could be variable SignalIn, Variable 2 (241) could be variable SignalOut, and Variable 3 (242) could be variable Volume. If each variable 240–242 is four bytes in size then the offset from the first element of control information 216 Variable 1 (240) can be determined. Given a pointer to the control information 216, SignalIn would lie at an offset of 0 bytes, SignalOut would be at an offset of 4 bytes, and Volume would be at an offset of 8 bytes. Therefore, a raw machine code access of Volume could look like this:

mov EBX, ControlInformation; load pointer to ControlInfo into EBX mov EAX, [EBX+8]; load base+offset 8 into EAX register The variable description table 220 describes each variable in the control information block. The description includes the variable's name, its offset within the control information block, its minimum, maximum, and default values, and a flag to indicate if the variable is controllable by the user. Each of these properties can be set by the graphical designer 10 described earlier.

Figure 2B:
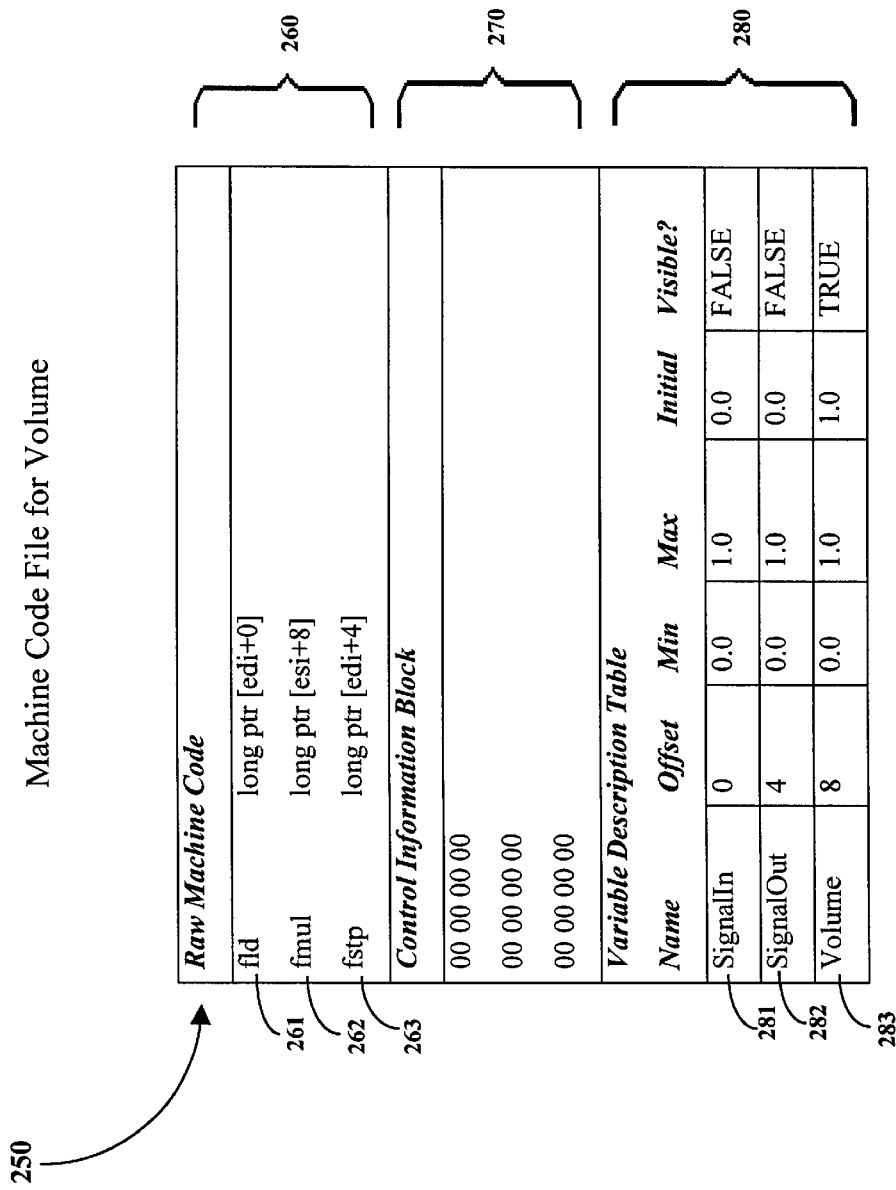
FIG. 2B is an embodiment of a machine code file for a volume control.

Referring to FIG. 2B, an embodiment of a complete machine code file for a volume control 250 has raw machine code 260, control information 270, and variable description table 280. The raw machine code 260 includes a load instruction 261, a multiply instruction 262 and a store instruction 263. The raw machine code 260 assumes that register pointer EDI is initialized to the location of the control information block 270 in memory. The control information block 270 is initially all zeros until the data is written into the control block. The information necessary to initialize the control information block 270 is included in variable description table 280. Variable description table 280 includes information for variable SignalIn 281. SignalIn is shown to be at offset 0 in the control information block 270, have a minimum value of 0, and maximum value of 1.0, an initial value of 0, and a flag indicating that it is not visible to the user. The entry for SignalOut in the variable description table 282 shows similar information except for an offset of 4. The entry for Volume in the variable description table 283 shows Volume to be at offset 8, minimum value of 0, maximum value of 1.0, and initial value of 1.0. The Visible flag indicates that Volume is visible to the user.

Figure 3:
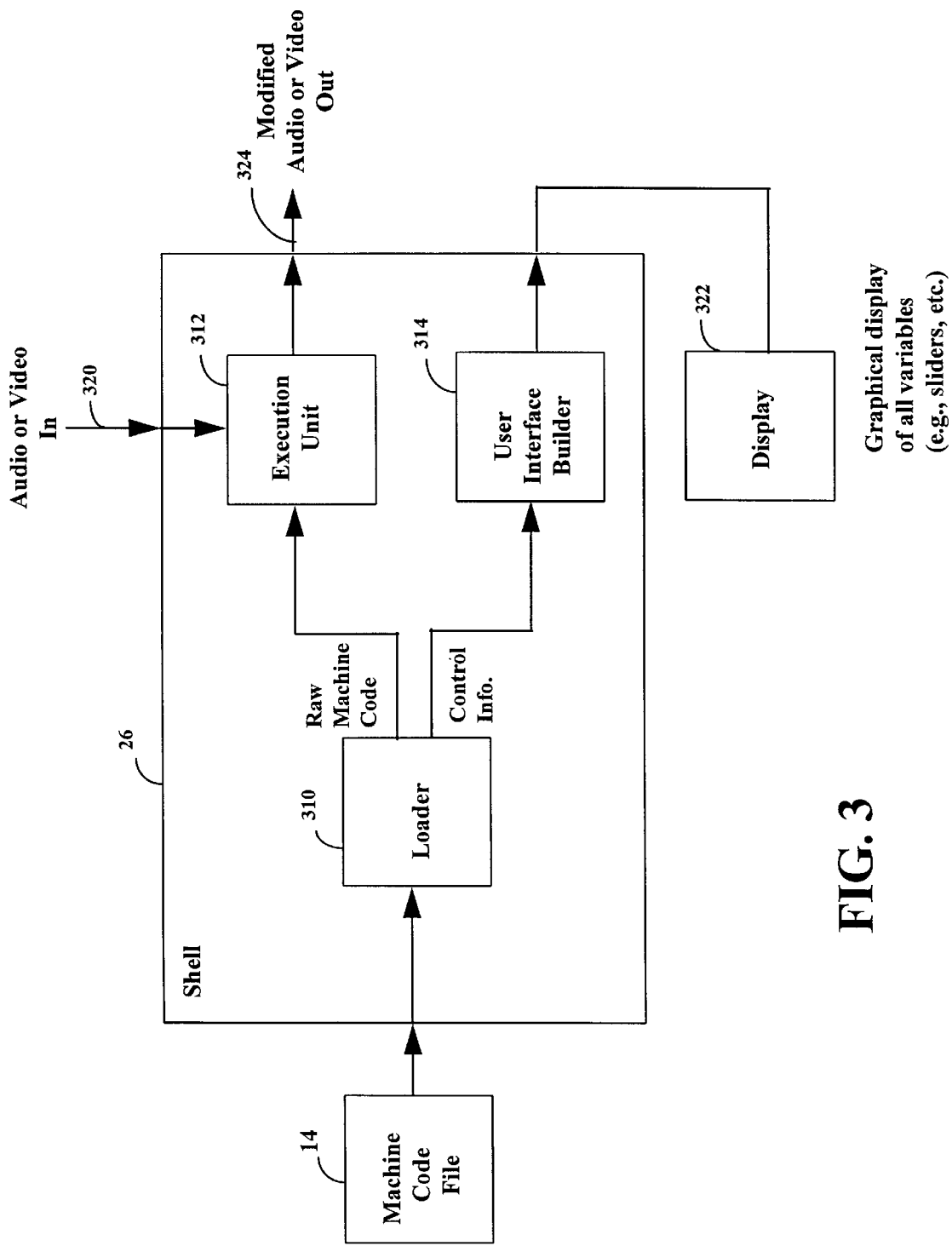
FIG. 3 is a block diagram of the shell shown in FIG. 1B.

Referring to FIG. 3, the shell 26 includes a loader 310, execution unit 312, and user interface builder 314. The loader 310 receives the machine code file 14. The loader 310 passes the raw machine code to the execution unit 312, which causes the code to be run by the processor. The execution unit 312 receives audio or video as an input 320 and runs the raw machine code to process the signals. The modified audio or video is output by the execution unit 312. As long as the processor speed is adequate to handle the signal processing system constructed by the user, the system processes signals in real time. The control information is passed to user interface builder 314. User interface builder graphically displays the variables in the control information.

In one embodiment the user interface builder 314 allows the user to modify the variables while the code is running. The user interface builder 314 scans through the variable description table 220 looking for entries which were designated as user-controllable. Whenever it finds such an item, it constructs an interface element, for example a slider or knob, and associates that interface element with the variable's offset in the control information block 216. When the user moves the slider or knob, the user interface code writes a value into the control information block at the specified offset. Since the raw machine code 218 and the user interface have access to the same set of control information variables 216, the new value is operated on by the raw machine code 218.

Figure 4:
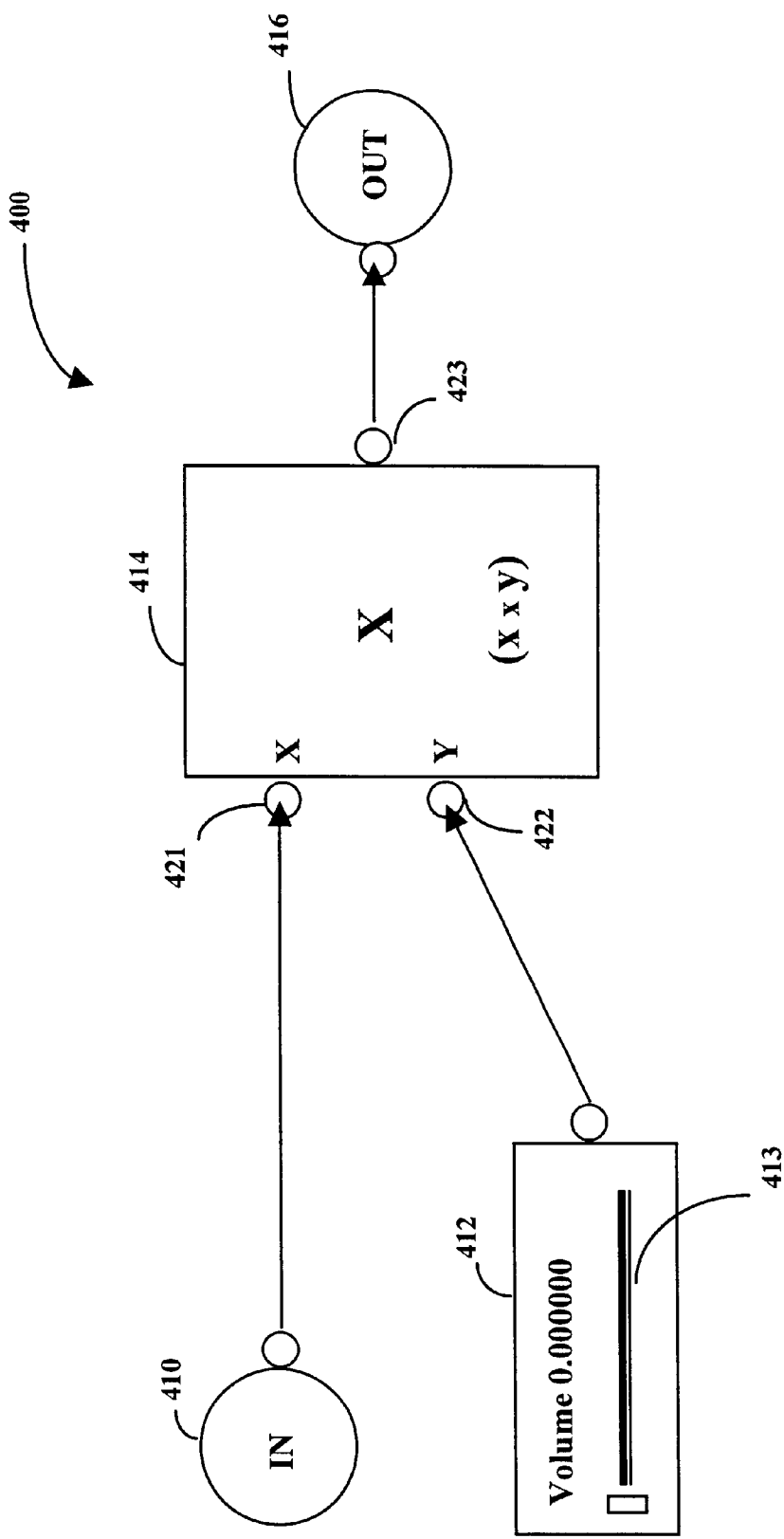
FIG. 4 is a graph of a simple signal processing system.

FIG. 4 is a graph of a simple signal processing system 400 according to the present invention. This graph was designed by an embodiment of the graphical interpreter 10. The signal processing system 400 has a system input 410 and a system output 416. The system input 410 has one output pin. The system output 416 has one input pin. The system output 416 may have more than one input pin if there are more than one system output channels. For example, a stereo output would have two channels.

The signal processing system 400 is a volume control. The multiplier 414 has two input pins 421, 422 and one output pin 423. The inputs to the multiplier 414 are connected to the output pin of the system input 410 and the output pin of volume variable slider 412. The output pin of the system input 410 is connected to multiplier 414 input pin X 421. Volume variable slider 412 is connected to multiplier 414 input pin Y 422. Volume variable slider 412 only has an output pin, and the output is determined by the setting of slider bar 413. In FIG. 4, slider bar 413 is set to 0, and that setting is reflected in the number above the slider bar. The output pin 423 of the multiplier 414 is connected to system output 416.

Each element of a signal processing system designed with graph interpreter 10 is referred to as a block. For example, referring again to FIG. 4, multiplier 414 is one block. Each block has signal inputs, signal outputs, control inputs, and functionality associated with the block. As the user graphs a signal processing system, graph designer 10 stores a representation of each block in memory, hard disk, or other data store. A representation of a block 500 is shown in FIG. 5A. The block 500 of FIG. 5A includes an array of input pins 502, an array of output pins 504, and an array of control pins 506. The InputPins[] 502, OutputPins[] 504, and ControlPins[] 506 are each an array of Pin objects. These arrays contain information about the input, output and controls of each Block. The Block also includes Boolean variable Visited 508, which is a variable used during compilation to indicate whether the block has been compiled. The visited variable is used to prevent an infinite loop when compiling graphs which contain circular dataflow paths. This is explained further in the discussion of FIG. 6. The block also includes function Compile() 510. Compile() 510 is a function that produces code implementing functionality for a specified output pin.

Figure 5B:
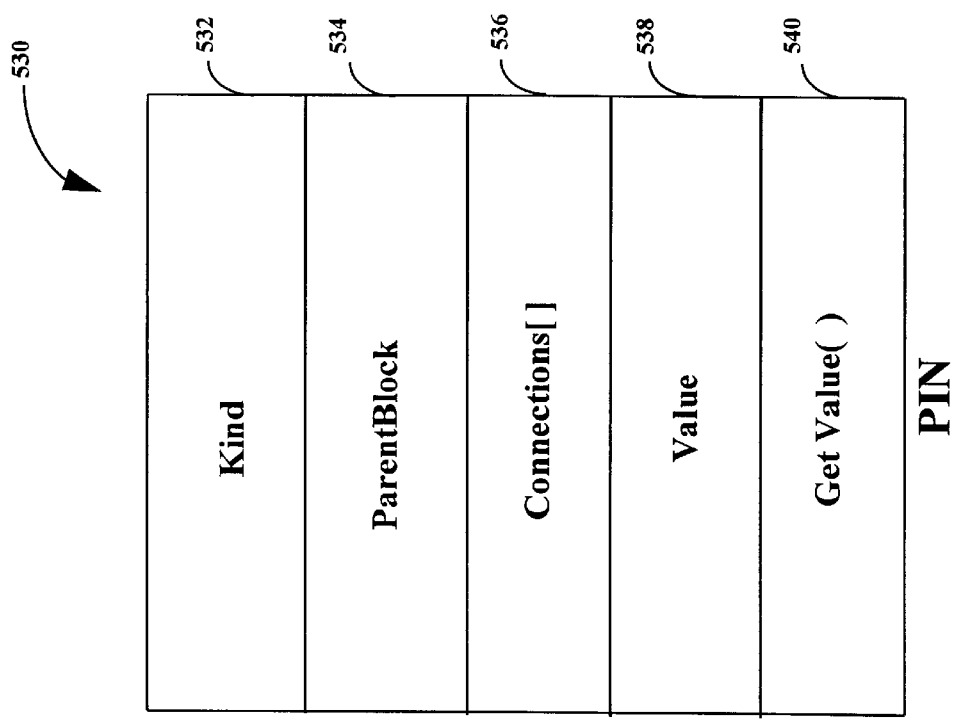
FIG. 5B is a pin object of the type included in the block object of FIG. 5A.

FIG. 5B shows the composition of a Pin object 530. Pin object 530 includes Kind 532, which is a symbol describing what kind of pin the object is, that is whether it is an input, or control pin. Parent Block 534 identifies the Block to which the pin belongs. Connections[] 536 is an array of pointers to Pin objects that are connected to the pin. If the pin is an input pin, this list can contain at most a single element. If the pin is an output, the array contains pointers to the pin objects of all the connections. Value 538 is a value object for the pin produced as a result of compilation. It doesn't hold an actual value number, rather it contains the information necessary to generate a code sequence to load the value. This information might be simply the offset into the control information block described above. In this case, if a pin produces a run time value, the value is stored in the control information block at that particular offset. When the raw machine code needs the value, it loads the data from the control information block at the offset for that pin. GetValue[] 540 is a function to determine and retrieve a pin's value.

Figure 5C:
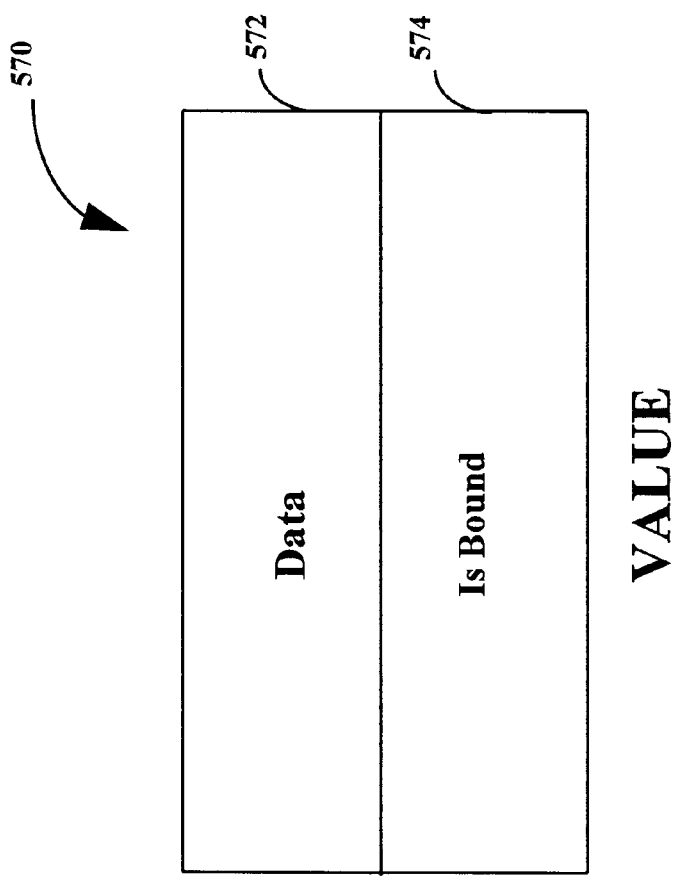
FIG. 5C is a value object of the type included in the pin object of FIG. 5B.

FIG. 5C shows a value object 570. The value object 570 includes data 572, which is the offset into the control information block for the value, and boolean IsBound 574. Boolean IsBound 574 indicates whether a value has been bound during the compile process, that is whether a value has been assigned to the variable.

The GetValue() function operates in the following manner: If the pin value is bound, then function GetValue() returns the pin value. If the pin value is not bound, then the function determines the type of pin, that is if the pin is an input, control, or output. If the pin is an input or control pin, then the pin value comes from the pin connections, that is the output pin of the block connected to that pin. If the pin is an output, then the block is compiled, the value determined, and the pin value returned. The GetValue() function 540 operates as shown in the following pseudo-code:

```
function Get Value (Pin pin)
    if pin.Value.IsBound then
        return pin.Value
    elseif pin.Kind=input or pin.Kind=control then
        return GetValue(pin.Connections[1])
    elseif pin.Kind=output then
        ParentBlock.Compile(this)
        return pin.Value
    end if
end function
```

The Compile() function 510 is different for each block because the Compile() function produces code to accomplish the function of that block. For example, the Compile for an adder function produces code to implement an addition, and the Compile for a multiplier produces the code for multiplication. Native machine code is generated by appending bytes to an output data buffer. Every native processor instruction such as "MOV EAX, [EBX+8]" is encoded in machine language by one or more bytes. These bytes are appended to the data buffer by the compiler.

For example, in the particular case where the compiler must generate code to load an output pin value, it proceeds as follows. The pin.Value variable contains an offset into the control information block for that variable. The compiler then generates a "based addressing" type of instruction to fetch the pin's value. For example, if pin.Value is equal to 4, meaning an offset of 4 bytes the compiler would generate the instruction FLD [ESI+4].

To compile a graph, the compile function first looks at the visited variable. If the block has already been visited, then code is generated to load the output pin value. If the block has not been visited, then the code is generated to produce the output value. This is accomplished in the following manner. If visited is false then the GetValue() function is called to get the value at the input pins. If the input values are not bound, this may cause an iterative step of looking at the pins connected to the input, and compiling blocks that are earlier in the chain. Once the block input values have been determined, the native machine code to load the value(s) from the input(s) is generated. Then, the code to implement the block functionality is generated. If there is more than one output connection, then the output pin value is stored. Finally, the IsBound variable is set to indicate that the value is bound.

As an example, pseudo-code for the addition operator is now presented. The addition operator receives input from two pins and calculates the sum of those two inputs, which it outputs to an output pin. The pseudo-code flow is as follows:

```
function AdditionBlock::Compile(Pin OutPin)
    if Visited then
        . . . emit machine code: LOAD OutPin.Value . . .
    else
        Visited=true
        Value Value1=GetValue(InputPins[1])
        Value Value2=GetValue(InputPins[2])
        . . . emit machine code: LOAD Value1 . . .
        . . . emit machine code: ADD Value2 . . .
        if OutPin.Connections.GetCount>1 then
            . . . emit machine code: STORE OutPin.Value . . .
        end if
        OutPin.Value.IsBound=true
    end if
end function
```

To begin interpreting a graph, the compiler begins by calling GetValue() on the input pin(s) of system output 416. In the signal processing system of FIG. 4, for example, there is only one input pin. Compilation begins by calling GetValue() for the one input pin of system output 416. If the output had more than one channel, the compiler would call GetValue() for each of the input pins of system output 416.

Referring again to the simple volume control of FIG. 4, the following discussion illustrates how a design is compiled into native machine code. In the following discussion, system output 416 is referred to as "SignalOut," system input 410 is referred to as "SignalIn," multiplier 414 is referred to as "Multiplier," and volume control 412 is referred to as "Volume." The compiler begins by calling GetValue() on SignalOut.InPin, that is by getting the value for the input pin of system output 416. As reflected in the pseudo-code for the GetValue() function, the compiler first checks to see if the value of the pin is already bound. The value of a pin is initially not bound, so the compiler determines the pin type. SignalOut.InPin is an input pin, so the compiler then looks to the connection to the input pin. In this case, SignalOut.InPin is connected to multiplier 414 output pin 423 Multiplier.OutPin. The compiler then attempts to determine the value of Multipler.OutPin by calling the GetValue() function for Multiplier.OutPin. This pin is also not bound, and the pin is an output, so the Multiplier Compile() function is called for the multiplier output pin 423.

The Compile() function generates the code to retrieve the values at the inputs and to do the necessary arithmetic. The compiler first calls GetValue() on the first multiplier input pin 421. This pin is not bound, and it is an input, so the compiler looks to pin connected to multiplier input pin 421. The pin that is connected to multiplier input pin 421 is in this case the output pin of system input 410.

The output pin of system input 410 is SignalIn.OutPin. Function GetValue() is called for SignalIn.OutPin. The pin is not bound, so the GetValue() function determines the pin type of SignalIn.OutPin. SignalIn.OutPin is an output pin. The compiler then calls the Compile() function associated with the system input block for the SignalIn.OutPin. The system input block Compile() function emits machine code to load the Sample value, and returns that value. This completes the compiler flow for SignalIn.OutPin and Multiplier.Input1.

The compiler next calls GetValue() on the second multiplier input pin 422. The second multiplier input pin 422 is an input, so the compiler looks to the pin connected to the input. In this case the connected pin is the volume control 412 output pin Volume.OutPin. The compiler calls GetValue() for Volume.OutPin, which is an output, so the volume block Compile() function runs for Volume.OutPin. This generates code to load the volume control data.

Having determined the values of the multiplier input pins 421, 422, the compiler then emits the code for the multiply operation. This result is output to the system output 416. A pseudocode flow for this operation just described is as follows:

```
enter GetValue( SignalOut.InPin)
    SignalOut.InPin.Kind = input, so calls GetValue(
    Multiplier.OutPin)
    enterGetValue( Multiplier.OutPin)
        Multiplier.OutPin.Kind = output, so call
        Multiplier.Compile(Multiplier.OutPin)
        enter Multiplier.Compile ( Multiplier, OutPin)
        Calls GetValue (Multiplier.Input1) to get first input value
enter GetValue ( Multiplier.Input1)
    Multiplier.Input1.Kind = input, so calls GetValue(
    SignalIn.Outpin)
    enter GetValue ( SignalIn.OutPin)
        SignalIn.OutPin.Kind. = output, so calls
        SignalIn.Compile( SignalIn.OutPin)
        enter SignalIn.Compile( SignalIn.OutPin)
```

-continued

```
            emit code: LOAD Sample
        exit SignalIn.Compile
    exit GetValue
exit GetValue
Calls GetValue( Multiplier.Input2) to get second input value
enter GetValue( Multiplier.Input2)
    Multiplier.Input2.Kind = input, so calls GetValue
    ( Volume.OutPin)
    enter GetValue( Volume.OutPin)
    Volume.OutPut.Kind = output, so calls Volume.Compile(
    Volume.OutPin)
    enter Volume.Compile (Volume.OutPin)
        emit code: LOAD Volume
    exit Volume.Compile
    exit GetValue
    exit GetValue
    emit code: Multiply
exit Multipiier.Compile
exit GetValue
```

Figure 6:
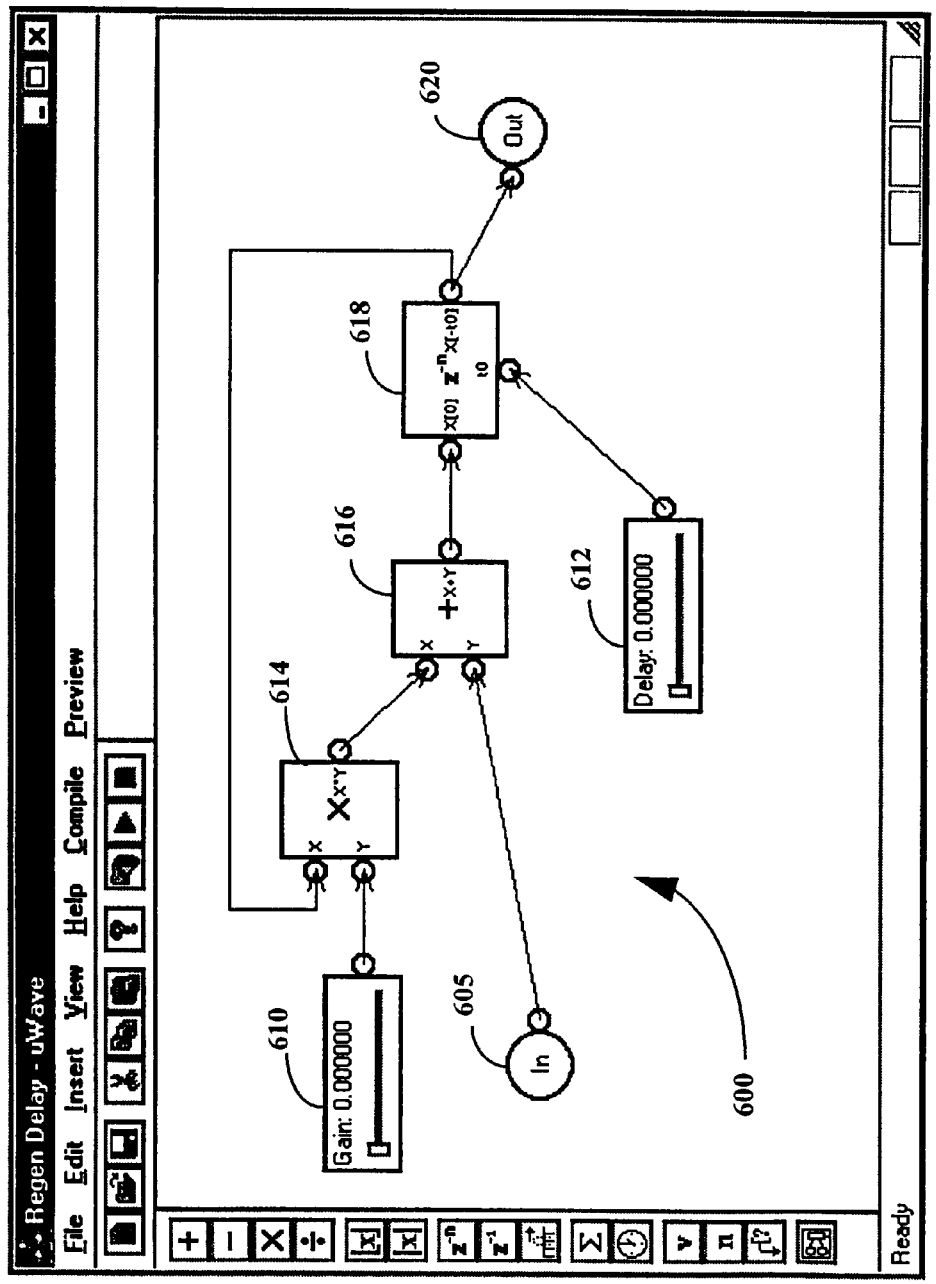
FIG. 6 is a graph of a delay network.

In FIG. 6, a signal processing system 600 that is more complicated than the volume control of FIG. 4 is shown in a screen shot from a software program according to the invention. The signal processing system graphed in FIG. 6 applies a fixed time delay to an audio stream, and feeds the delayed signal back upon the original. In the design of FIG. 6, system input 605 is connected to adder 616. The output of adder 616 is fed into a delay 618. The delay 618 time is determined by delay slider 612, which is also connected to delay 618. The output of delay 618 is connected to the system output 620 and also to multiplier 614. Multiplier 614 has inputs from delay 618 and gain slider 610. Multiplier 614 multiplies gain 610 by delay 618 output. Multiplier output 614 is connected to an input of adder 616. In this way the delay 618 output is scaled before it is added to the input signal. Although this system is more complicated than the volume control of FIG. 4, a compile would follow a similar flow, beginning with a GetValue() of the system output's input pin.

Referring to FIG. 6 and to FIG. 5A and FIG. 5C, the visited variable 508 and IsBound variable 574 are useful for compiling the graph 600 of FIG. 6 because there is a circular data flow. To compute the output of the delay 618, the compiler would to compute the value of adder 616, which would compute the output of multiplier 614, which would compute the value of delay 618, ad infinitum. The visited flag prevents this from happening. When the delay block 618 is first encountered by the compiler, its visited flag is set to true, its output pin is assigned a value (i.e. an offset into the control information block) and IsBound is set to true for that pin. When the compiler completes the loop just described, and attempts to compute the value of the output pin of delay block 618 for the second time, the compiler will find that block has been visited and that the pin has a bound value and will generate the machine code to fetch the data from its location in the control information block.

It is possible to encapsulate a system according to the present invention, so that the encapsulated system can be included as a block in the graph designer. The graphical design tool is able to load and save its own workspace files, which contain an image of the blocks within the graph and their interconnections. A workspace file contains an image of all Block, Pin, and Value objects. When the user includes an encapsulated system in an existing design, the encapsulated system is "spliced" into the system that includes it.

The design tool creates a composite block object that interfaces to the encapsulated file. Pins are added to the composite block by the following rules: An input pin is added to the composite block for every signal input block in the encapsulated design, and for each unconnected input to block(s) within the encapsulated design. An output pin is added to the composite block for every signal output block in the encapsulated design, and for each unconnected output from block(s) within the encapsulated design. A control pin is added to the composite block for each variable block in the encapsulated design.

Internally, each composite block contains an exact image of the loaded encapsulated workspace file. When the graph compiler attempts to compile this composite block, it compiles the encapsulated graph as if it were a top-level unencapsulated graph. For example, the system of FIG. 6 can be encapsulated into another system as a block with one signal input pin, one output pin, and two control pins. This is illustrated in FIG. 7.

Figure 7:
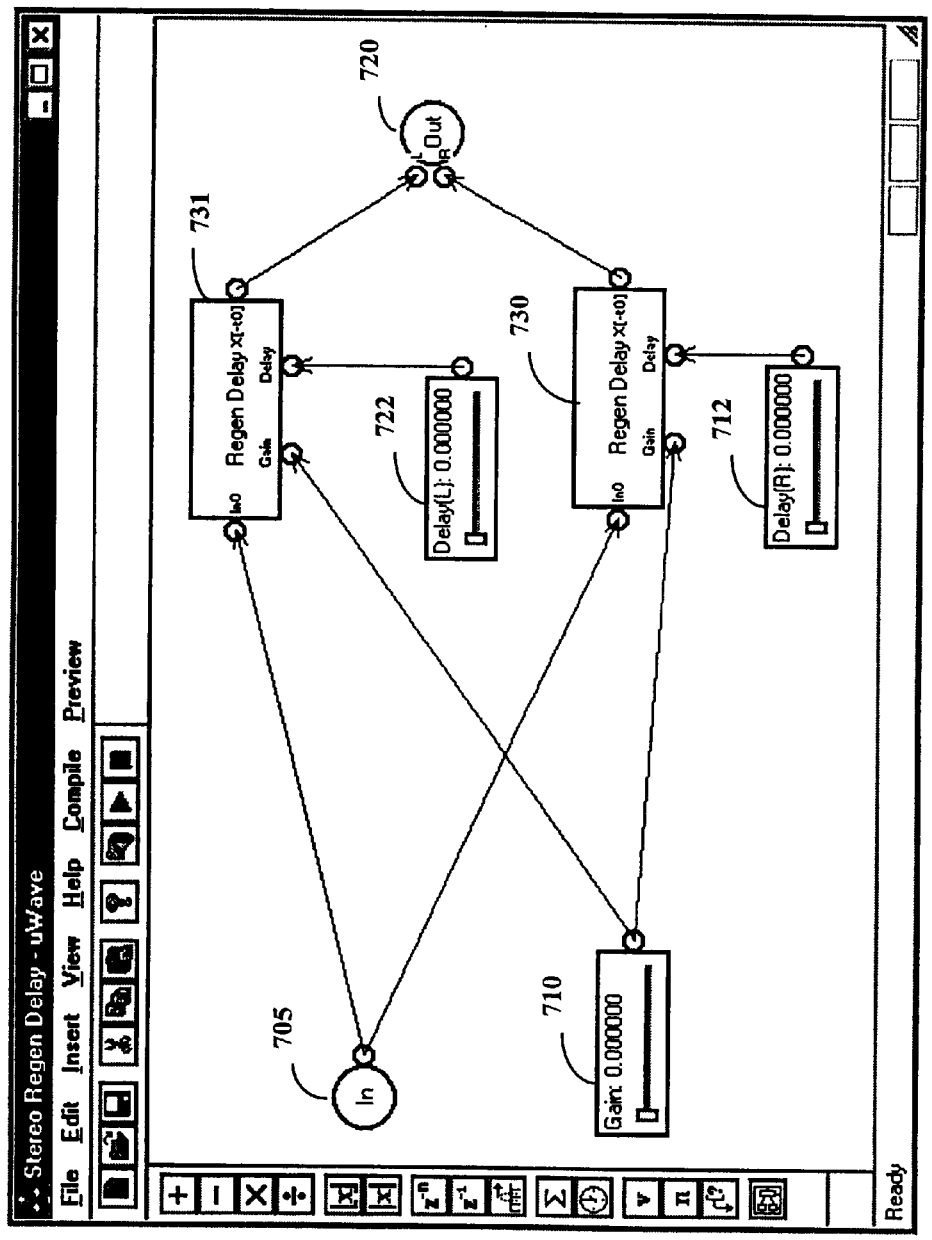
FIG. 7 is a graph of a delay network that encapsulates the delay network of FIG. 6.

The signal processing system of FIG. 7 includes a system input 705 that is divided between two delays 730, 731. Delay blocks 730, 731 each encapsulate the signal processing system designed in FIG. 6. Each delay 730, 731 has 3 inputs, In0, Gain, and Delay, and one output. The two delays 730, 731 share the same input, system input 705. The two delays 730, 731 share the same gain input, gain slider 710. Each delay 730, 731 has a different delay input. Delay 731 is connected to delay slider 722 and delay 730 is connected to delay slider 712. Both delays 730, 731 output to system output 720, which in this case is a stereo output, and so has to input pins. By encapsulating a previous design, the user is able to design increasingly complex signal processing systems. The design of FIG. 7 uses two instances of the delay of FIG. 6 to create a stereo version of the same effect.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method of creating and using a file with instructions representative of a real-time audio signal processing system, comprising:

allowing a user to construct graphically the real-time audio signal processing system;

compiling the graphically constructed real-time audio signal processing system beginning at an output of the real-time audio signal processing system to generate native processor executable instructions that when executed implement the real-time audio signal processing system;

storing the native processor executable instructions in a program file;

receiving audio input in real-time; and executing the native processor executable instructions in the program file to modify the real-time audio input in accordance with the real-time audio signal processing system.

2. The method of claim 1 wherein the step of compiling the graphically constructed real-time audio signal processing system comprises beginning at the output of the signal processing system and generating native processor executable instructions for each block of the real-time audio signal processing system by:

(a) compiling inputs connected to the block;

(b) generating native processor executable instructions to make the compiled inputs available to the block; and (c) generating native processor executable instructions to perform the block function.

3. The method of claim 1 wherein the storing step comprises storing the executable instructions in the program file in a format that allows the program file to be incorporated into and executed by a software application program.

4. The method of claim 3 wherein the executing step comprises executing the program file by a software application program other than a program that allows a user to construct graphically a real-time audio signal processing system.

5. The method of claim 1 wherein the executing step comprises executing the native processor executable instructions in the program file to modify the real-time audio input in accordance with the real-time audio signal processing system and such that a variable input can be adjusted in real-time.

6. The method of claim 5 wherein the executing step comprises executing the native processor executable instructions in the program file to modify the real-time audio input in accordance with the real-time audio signal processing system and such that a volume control can be adjusted in real-time.

7. The method of claim 1 wherein the step of compiling the graphically constructed real-time audio signal processing system includes generating optimized native processor code.

8. A system for creating and using a file with instructions representative of a real-time audio signal processing system, comprising:

a graphical designer for allowing a user to construct graphically the real-time audio signal processing system;

a compiler for compiling the graphically constructed real-time audio signal processing system, beginning at an output of the real-time audio signal processing system, to generate native processor executable instructions that when executed implement the real-time audio signal processing system;

a program file for storing the native processor executable instructions; and a processor for executing the native processor executable instructions in the program file to modify real-time audio input in accordance with the real-time audio signal processing system.

9. The system of claim 8 wherein the compiler compiles the graphically constructed real-time audio signal processing system beginning at an output of the signal processing system output, and generates executable instructions for each block by compiling the real-time audio inputs connected to the block, generating native processor executable instructions to make the compiled inputs available to the block, and generating native processor executable instructions to perform the block function.

10. The system of claim 8 wherein the program file is in a format that allows the program file to be incorporated into and executed by a software application program.

11. The system of claim 10 wherein the processor executes a software application program other than a program that allows a user to construct graphically a real-time audio signal processing system, and the software application program incorporates and executes the program file.

12. The system of claim 8 wherein the processor executes the native processor executable instructions in the program file to modify the real-time audio input in accordance with the real-time audio signal processing system and such that a variable input can be adjusted in real-time.

13. The system of claim 2 wherein the processor executes the native processor executable instructions in the program file to modify the real-time audio input in accordance with the real-time audio signal processing system and such that a volume control can be adjusted in real-time.

14. The system of claim 8 wherein the compiler comprises an optimizer for generating optimized native processor code.

15. A method of creating and using a file with instructions representative of a real-time audio signal processing system, comprising:

allowing a user to construct graphically the real-time audio signal processing system;

compiling the graphically constructed real-time audio signal processing system to generate native processor executable instructions that when executed implement the real-time audio signal processing system;

storing the native processor executable instructions in a program file in a format that allows the program file to be incorporated into and executed by a software application program;

receiving audio input in real-time; and executing the native processor executable instructions in the program file to modify the real-time audio input in accordance with the real-time audio signal processing system and such that a variable input can be adjusted in real-time.

16. The method of claim 15 wherein the executing step comprises executing the program file by a software application program other than a program that allows a user to construct graphically a real-time audio signal processing system.

17. A system for creating and using a file with instructions representative of a real-time audio signal processing system, comprising:

a graphical designer for allowing a user to construct graphically the real-time audio signal processing system;

a compiler for compiling the graphically constructed real-time audio signal processing system to generate native processor executable instructions that when executed implement the real-time audio signal processing system;

a program file for storing the native processor executable instructions in a format that allows the program file to be incorporated into and executed by a software application program; and a processor for executing the native processor executable instructions in the program file to modify real-time audio input in accordance with the real-time audio signal processing system.

18. The system of claim 17 wherein the processor executes a software application program other than a program that allows a user to construct graphically a real-time audio signal processing system, and the software application program incorporates and executes the program file.

19. A method of creating and using a file with instructions representative of a real-time audio signal processing system, comprising:

allowing a user to construct graphically the real-time audio signal processing system;

compiling the graphically constructed real-time audio signal processing system to generate native processor executable instructions that when executed implement the real-time audio signal processing system;

storing the native processor executable instructions in a program file;

receiving audio input in real-time; and executing the native processor executable instructions in the program file to modify the real-time audio input in accordance with the real-time audio signal processing system and such that a variable input can be adjusted in real-time.

20. The method of claim 19 wherein the executing step comprises executing the native processor executable instructions in the program file to modify the real-time audio input in accordance with the real-time audio signal processing system and such that a volume control can be adjusted in real-time.

21. A system for creating and using a file with instructions representative of a real-time audio signal processing system, comprising:

a graphical designer for allowing a user to construct graphically the real-time audio signal processing system;

a compiler for compiling the graphically constructed real-time audio signal processing system to generate native processor executable instructions that when executed implement the real-time audio signal processing system;

a program file for storing the native processor executable instructions; and a processor for executing the native processor executable instructions in the program file to modify real-time audio input in accordance with the real-time audio signal processing system and such that a variable input can be adjusted in real-time.

22. The system of claim 21 wherein the processor executes the native processor executable instructions in the program file to modify the real-time audio input in accordance with the real-time audio signal processing system and such that a volume control can be adjusted in real-time.

23. A method of creating and using a file with instructions representative of a real-time audio signal processing system, comprising:

allowing a user to construct graphically the real-time audio signal processing system;

compiling the graphically constructed real-time audio signal processing system to generate optimized native processor executable instructions that when executed implement the real-time audio signal processing system;

storing the native processor executable instructions in a program file;

receiving audio input in real-time; and executing the native processor executable instructions in the program file to modify the real-time audio input in accordance with the real-time audio signal processing system.

24. The method of claim 23 wherein the step of compiling the graphically constructed real-time audio signal processing system comprises compiling the graphically constructed real-time audio signal processing system at an output of the real-time audio signal processing system.

25. The method of claim 24 wherein the step of compiling the graphically constructed real-time audio signal processing system comprises beginning at the output of the signal processing system and generating optimized native processor executable instructions for each block of the real-time audio signal processing system by:

(a) compiling inputs connected to the block;

(b) generating optimized native processor executable instructions to make the compiled inputs available to the block; and (c) generating optimized native processor executable instructions to perform the block function.

26. The method of claim 23 wherein the storing step comprises storing the executable instructions in the program file in a format that allows the program file to be incorporated into and executed by a software application program.

27. The method of claim 26 wherein the executing step comprises executing the program file by a software application program other than a program that allows a user to construct graphically a real-time audio signal processing system.

28. The method of claim 23 wherein the executing step comprises executing the optimized native processor executable instructions in the program file to modify the real-time audio input in accordance with the real-time audio signal processing system and such that a variable input can be adjusted in real-time.

29. The method of claim 28 wherein the executing step comprises executing the native processor executable instructions in the program file to modify the real-time audio input in accordance with the real-time audio signal processing system and such that a volume control can be adjusted in real-time.

30. A system for creating and using a file with instructions representative of a real-time audio signal processing system, comprising:

a graphical designer for allowing a user to construct graphically the real-time audio signal processing system;

a compiler comprising an optimizer, the compiler for compiling the graphically constructed real-time audio signal processing system to generate optimized native processor executable instructions that when executed implement the real-time audio signal processing system;

a program file for storing the native processor executable instructions; and a processor for executing the native processor executable instructions in the program file to modify real-time audio input in accordance with the real-time audio signal processing system.

31. The system of claim 30 wherein the compiler compiles the graphically constructed real-time audio signal processing system beginning at an output of the real-time audio signal processing system.

32. The system of claim 30 wherein the compiler compiles the graphically constructed real-time audio signal processing system beginning at an output of the signal processing system output, and generates executable instructions for each block by compiling the real-time audio inputs connected to the block, generating native processor executable instructions to make the compiled inputs available to the block, and generating native processor executable instructions to perform the block function.

33. The system of claim 30 wherein the program file is in a format that allows the program file to be incorporated into and executed by a software application program.

34. The system of claim 33 wherein the processor executes a software application program other than a program that allows a user to construct graphically a real-time audio signal processing system, and the software application program incorporates and executes the program file.

35. The system of claim 30 wherein the processor executes the native processor executable instructions in the program file to modify the real-time audio input in accordance with the real-time audio signal processing system and such that a variable input can be adjusted in real-time.

36. The system of claim 35 wherein the processor executes the native processor executable instructions in the program file to modify the real-time audio input in accordance with the real-time audio signal processing system and such that a volume control can be adjusted in real-time.

* * * * *